United States Patent
Hashiguchi et al.

[11] Patent Number: 6,068,872
[45] Date of Patent: May 30, 2000

[54] VACUUM-HEAT PROCESSING METHOD

[75] Inventors: Toshio Hashiguchi; Nobuo Myojin, both of Okayama; Nobuo Iwase, Hiroshima; Tetsuya Hayashi, Chiba, all of Japan

[73] Assignees: Asahi Engineering Co., Ltd., Osaka; Iwase Corporation Ltd., Hiroshima, both of Japan

[21] Appl. No.: 09/412,324

[22] Filed: Oct. 5, 1999

Related U.S. Application Data

[62] Division of application No. 09/106,305, Jun. 29, 1998, Pat. No. 5,988,051.

[30] Foreign Application Priority Data

Jun. 30, 1997 [JP] Japan .................................. 9-173935

[51] Int. Cl.$^7$ ...................................................... A23L 1/01
[52] U.S. Cl. ......................... 426/438; 426/443; 426/523
[58] Field of Search ..................................... 426/438, 443, 426/523

[56] References Cited

U.S. PATENT DOCUMENTS

| | | | |
|---|---|---|---|
| 3,718,485 | 2/1973 | Lankford | 426/438 |
| 4,059,046 | 11/1977 | Yamazaki et al. | 99/355 |
| 4,732,081 | 3/1988 | Sakuma | 426/438 X |
| 4,769,249 | 9/1988 | Webb | 426/438 |
| 4,828,859 | 5/1989 | Imai | 426/438 X |
| 4,844,931 | 7/1989 | Webb | 426/438 |
| 4,852,475 | 8/1989 | Yang | 99/409 |
| 4,873,920 | 10/1989 | Yang | 99/472 X |
| 4,985,266 | 1/1991 | Sakuma | 426/438 |
| 5,168,797 | 12/1992 | Wang | 99/403 X |
| 5,179,891 | 1/1993 | Chiu | 210/167 X |
| 5,182,982 | 2/1993 | Hattori et al. | 99/404 |
| 5,235,903 | 8/1993 | Tippmann | 99/472 X |
| 5,239,915 | 8/1993 | Chiu | 99/407 |
| 5,263,406 | 11/1993 | Chiu | 99/472 X |
| 5,275,093 | 1/1994 | Chiu | 99/408 |
| 5,301,604 | 4/1994 | Takashashi | 99/407 |
| 5,676,042 | 10/1997 | Sakuma et al. | 99/330 |
| 5,767,487 | 6/1998 | Tippmann | 99/472 X |

FOREIGN PATENT DOCUMENTS

| | | |
|---|---|---|
| 51-82778 | 7/1951 | Japan . |
| 58-183048 | 10/1983 | Japan . |
| 60-92718 | 5/1985 | Japan . |
| 4-132527 | 5/1992 | Japan . |

*Primary Examiner*—Milton Cano
*Attorney, Agent, or Firm*—Finnegan, Henderson, Farabow, Garrett & Dunner, L.L.P.

[57] ABSTRACT

The vacuum-heat processing apparatus according to the present invention includes: a vacuum container forming a vacuum chamber; a hopper into which an object to be processed and a processing liquid adjusted to a first temperature are thrown, the hopper being arranged above and communicating with an intake port formed in an upper end portion of the vacuum container; a sealing member arranged between the hopper and the intake port of the vacuum container to keep the vacuum chamber airtight; a transport conveyor installed in the vacuum chamber below the intake port to receive at one end side thereof the object flowing down the hopper from the intake port through the sealing member and carry it to the other end side; a processing liquid showering nozzles installed in the vacuum chamber immediately above the transport conveyor to shower a processing liquid adjusted to a second temperature over the object on the transport conveyor; a processing liquid tank containing a processing liquid adjusted to a third temperature and installed in the vacuum chamber immediately below the transport conveyor to receive the object dropped from the transport conveyor; at least one liquid removing device provided immediately below and communicating with a discharge port formed in a lower end portion of the vacuum container to remove the processing liquid from the object; and a transport device installed in the vacuum chamber to carry the object in the processing liquid tank to the liquid removing device.

7 Claims, 3 Drawing Sheets

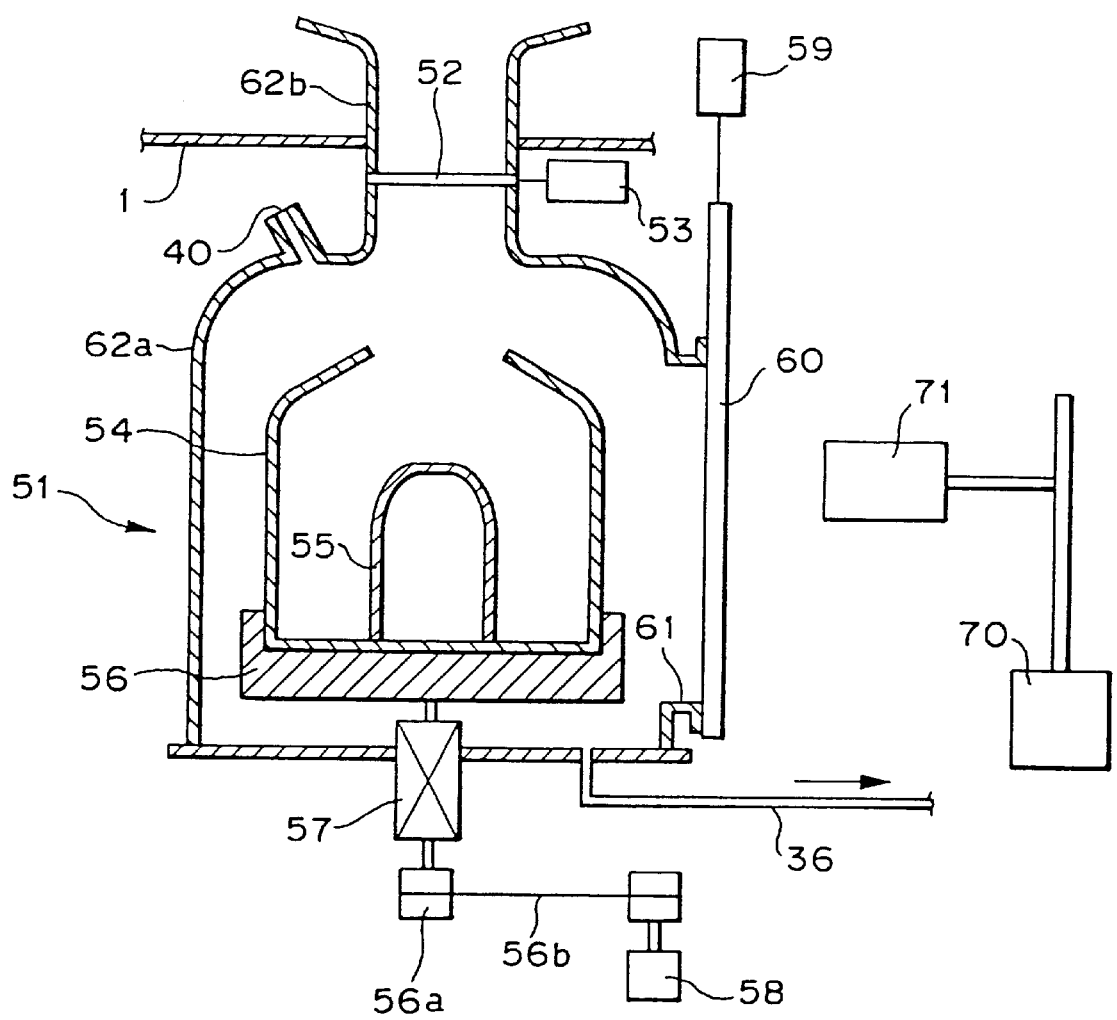
F I G. 2

VACUUM-HEAT PROCESSING METHOD

This is a division of application Ser. No. 09/106,305, filed on Jun. 29, 1998, now U.S. Pat. No. 5,988,051 which is incorporated herein by reference.

This application is based on patent application No. 173,935/1997 filed Jun. 30, 1997 in Japan, all of the content of which is incorporated hereinto by reference.

BACKGROUND OF THE INVENTION

FIELD OF THE INVENTION

The present invention relates to a method and an apparatus for processing an object to be processed in a vacuum container under a reduced pressure therein by using a processing liquid and also to a method of manufacturing a dry food by processing a material in a reduced-pressure vacuum container and by removing oil from and drying the processed material.

The present invention, though most suited for the manufacture of a dry food, also has a wide range of applications, including the one of heating and drying wastes such as kitchen garbage to form compost.

Commonly used dry food making methods include a vacuum frying method. For example, Japanese Patent Application Publication No. 28865/1977 discloses an apparatus for making confectionery-like foods which has a frying area and a cooling area in a vacuum tank, and which fries a food material in the frying area and cools and hardens the fried material on a cooling table in the cooling area.

Other apparatuses, disclosed in Japanese Patent Application Laid-Open Nos. 183048/1983 and 92718/1985, place the material in contact with heated oil under a reduced pressure and remove the oil from the material under a reduced pressure to make dry foods continuously. A continuous vacuum fryer apparatus, disclosed in Japanese Patent Application Publication No. 59230/1995, seals the vacuum container from the outside by operating rotary valves installed in a liquid container and a transport passage, carries the food material into the vacuum container, and continuously heats the material with oil at a predetermined temperature in the vacuum container.

In the above-mentioned conventional apparatuses, the vacuum frying apparatus described in Japanese Patent Application Publication No. 28865/1977 is an apparatus for making a raised food which fries the material in the frying area and hardens the fried material in the cooling area while maintaining the raised state of the fried material. In this apparatus, because the fried material which is carried in the cooling area raises and hardens with the oil soaked in the fried material, it is not only impossible to remove the excessive oil in the food but also to obtain a good dry food which maintains an ideal porous state with the minimum oil soaked.

Because both the dry food making apparatuses described in Japanese Patent Application Laid-Open Nos. 183048/1983 and 92718/1985 directly expose the material to heated oil under a negative pressure thereafter removing the oil from and drying the material, the rapid change in the pressure and the high temperature of the oil cause rapid evaporation to the surface of the material, make it impossible to maintain an ideal porous state, and degrade the quality as a dry food. An infrared generator and a microwave generator, though their use may be effective, are expensive and, considering the service lives of the microwave generator and the cyclotron, they are not practical.

As for the continuous vacuum fryer apparatus disclosed in Japanese Patent Application Publication No. 59230/1995, the speed governing between the transport chain to which the processing container accommodating the material to be processed is secured and the rotary valves installed in the liquid container and the transport passage is complicated, rendering the high productivity not expectable. This prior art does not mention to the oil removing operation under a negative pressure, which is most effective in removing oil soaked in the material. Because the material is brought into contact with the oil at once, the quality as the dry food is degraded. Furthermore, because a plurality of oil tanks are arranged in series, the liquid container is elongate increasing the size of the apparatus as a whole.

SUMMARY OF THE INVENTION

A first object of the present invention is to provide a vacuum-heat processing method capable of rationally heating a material to be processed to maintain a high quality state of the material.

A second object of the present invention is to provide a vacuum-heat processing method capable of heating a material with a cooking oil to rationally make a high quality dry food.

A third object of the present invention is to provide a compact vacuum-heat processing apparatus capable of realizing the above-mentioned vacuum-heat processing method.

The first aspect of the present invention is in a vacuum-heat processing method comprising the steps of:

performing a first processing for an object to be processed by immersing the object in a processing liquid adjusted to a first temperature;

dropping the object subjected to the first processing onto a transport conveyor in a vacuum chamber;

performing a second processing for the object on the transport conveyor by showering it with a processing liquid adjusted to a second temperature; and performing a third processing for the objet subjected to the second processing by throwing it from the transport conveyor into a processing liquid adjusted to a third temperature, the processing liquid being contained in a processing liquid tank installed in the vacuum chamber.

According to the present invention, the method performs a first processing for an object to be processed by immersing the object in a processing liquid adjusted to a first temperature, drops the object onto a transport conveyor in a vacuum chamber, performs a second processing for the object on the transport conveyor by showering it with a processing liquid adjusted to a second temperature, and then performs a third processing for the object by dropping it into a processing liquid in a processing liquid tank adjusted to a third temperature.

In the vacuum-heat processing method by the first aspect of the present invention, the processing liquid used in the first processing may be dropped onto the transport conveyor in the vacuum chamber together with the object subjected to the first processing.

The vacuum-heat processing method may further comprise a step of transferring the object subjected to the third processing from the processing liquid tank to a second vacuum chamber provided below and communicating with the vacuum chamber and therein removing the processing liquid from the object.

A vacuum level in the second vacuum chamber may be set equal to or higher than that of the vacuum chamber.

The second aspect of the present invention is in a method of manufacturing a dry food comprising the steps of:

performing a first processing for a material to be made a dry food by immersing the material in a processing oil adjusted to a first temperature;

dropping the material subjected to the first processing onto a transport conveyor in a vacuum chamber;

performing a second processing for the material on the transport conveyor by showering it with a processing oil adjusted to a second temperature;

performing a third processing for the material subjected to the second processing by dropping it from the transport conveyor into a processing oil adjusted to a third temperature, the processing oil being contained in a processing oil tank installed in the vacuum chamber; and transferring the material subjected to the third processing from the processing oil tank to an oil removing means provided below and communicating with the vacuum chamber and then removing the processing oil from the material to produce a dry food.

According to the present invention, the method involves the following sequence of operations: performing a first processing for a material by immersing the material in a processing oil adjusted to a first temperature; dropping the material onto a transport conveyor in a vacuum chamber; performing a second processing for the material on the transport conveyor by showering it with a processing oil adjusted to a second temperature; performing a third processing for the material by dropping it into a processing oil in a processing oil tank adjusted to a third temperature; and transferring the material to an oil removing means and removing the oil from the material to produce a dry food.

In the dry food manufacturing method by the second aspect of the present invention, the processing oil used in the first processing may be dropped onto the transport conveyor in the vacuum chamber together with the material subjected to the first processing.

The second temperature is higher than the first temperature and the third temperature is higher than the second temperature.

The third aspect of the present invention is in a vacuum-heat processing apparatus comprising:

a vacuum container forming a vacuum chamber;

a hopper into which an object to be processed and a processing liquid adjusted to a first temperature are thrown, the hopper being arranged above and communicating with an intake port formed in an upper end portion of the vacuum container;

a sealing means arranged between the hopper and the intake port of the vacuum container to keep the vacuum chamber airtight;

a transport conveyor installed in the vacuum chamber below the intake port to receive at one end side thereof the object flowing down the hopper from the intake port through the sealing means and carry it to the other end side;

a processing liquid showering means installed in the vacuum chamber immediately above the transport conveyor to shower a processing liquid adjusted to a second temperature over the object on the transport conveyor; and a processing liquid tank containing a processing liquid adjusted to a third temperature and installed in the vacuum chamber immediately below the transport conveyor to receive the object dropped from the transport conveyor.

According to the present invention, an object to be processed and a processing liquid adjusted to a first temperature are thrown into a hopper to perform a first processing for the object, and these are dropped onto one end side of the transport conveyor in the vacuum chamber from an intake port of the vacuum container through a sealing means. Then, while being carried by the transport conveyor, the object is showered with a processing liquid adjusted to a second temperature to perform a second processing for the object. The object that has undergone the second processing while on the transport conveyor is then dropped from the other end portion of the transport conveyor into a processing liquid in the processing liquid tank adjusted to a third temperature to perform a third processing for the object.

In the vacuum-heat processing apparatus by the third aspect of the present invention, the sealing means may have at least one rotary valve.

The vacuum-heat processing apparatus may further comprise an auxiliary conveyor arranged between the intake port and the transport conveyor to carry the object to one end side of the transport conveyor.

The transport conveyor may have an endless meshlike belt having projecting partition members arranged at predetermined intervals along a transport direction, the processing liquid tank extends along the transport direction of the transport conveyor, and the object is dropped from the other end side of the transport conveyor into the processing liquid tank. In this case, the partition members may have a function of scooping out the object in the processing liquid tank from one end side of the processing liquid tank. Alternatively, the vacuum-heat processing apparatus may further comprise: at least one liquid removing means provided immediately below and communicating with a discharge port formed in a lower end portion of the vacuum container to remove the processing liquid from the object, the liquid removing means forming a second vacuum chamber; and a transport means installed in the vacuum chamber to carry the object in the processing liquid tank to the liquid removing means. In this case, the transport means may include the partition members, and the partition members may scoop the object in the processing liquid tank from the one end side of the processing liquid tank.

The vacuum container may have a cylindrical body and an end plate removably joined to the body, and wherein a platform car mounting the transport conveyor and the processing liquid tank and movable on a floor of the vacuum chamber in the direction of the end plate is further provided.

The vacuum-heat processing apparatus may further comprise: at least one liquid removing means provided immediately below and communicating with a discharge port formed in a lower end portion of the vacuum container to remove the processing liquid from the object, the liquid removing means forming a second vacuum chamber; and a transport means installed in the vacuum chamber to carry the object in the processing liquid tank to the liquid removing means. In this case, the vacuum-heat processing apparatus may further comprise: a sealing means arranged between the discharge port and the liquid removing means to keep the vacuum chamber airtight; and an open-close means provided to the liquid removing means to allow the object removed of the liquid by the liquid removing means to be taken out. Alternatively, a vacuum level in the second vacuum chamber may be set equal to or higher than that of the vacuum chamber.

The object to be processed may be a food and the processing liquid may be a cooking oil. In this case, the second temperature may be higher than the first temperature and the third temperature may be higher than the second temperature.

According to the present invention, because the object is introduced into the vacuum chamber from the top of the vacuum container by gravity, the processing liquid itself can be used as a sealing material and the sealing structure simplified. Further, because the transport conveyor is disposed above the processing liquid tank and the processing liquid showering means is arranged above the transport conveyor, the installation floor area of the vacuum container can be made smaller than that of the conventional vacuum container, reducing the size of the apparatus as a whole.

Before submerging the object in the processing liquid tank, this invention performs the first heating processing for the object under the atmospheric pressure and then showers the processing liquid over the object in the vacuum chamber to perform the second heating processing. In making a dry food, this sequence of steps can process the material to have an ideal porous state, producing a high quality dry food.

When the processing liquid tank and the transport conveyor are mounted on the platform car, they can be drawn out together with the platform car by removing the end plate of the vacuum container from the container body. Hence, inspection and maintenance such as repair and cleaning can be performed easily.

This invention can not only transform meats, vegetables or fruits into dry foods but also be used for heating and drying a variety of materials. For example, kitchen garbage can be processed with waste oil to transform it into compost continuously.

BRIEF DESCRIPTION OF THE DRAWINGS

The above and other objects, effects, features and advantages of the present invention will become more apparent from the following description of an embodiment thereof taken in conjunction with the accompanying drawings, in which:

FIG. 2 is an enlarged cross section of an oilremover of the embodiment shown in FIG. 1.

DETAILED DESCRIPTION OF THE PREFERRED EMBODIMENTS

One embodiment of the vacuum-heat processing apparatus of this invention that can realize the vacuum-heat processing method of the present invention will be described in detail for a case applied to a dry food making process by referring to FIGS. 1 to 3. However, the present invention can also be applied to technologies in other fields involving the similar problems, such as heating and drying of kitchen garbage for making compost.

Figure 1:
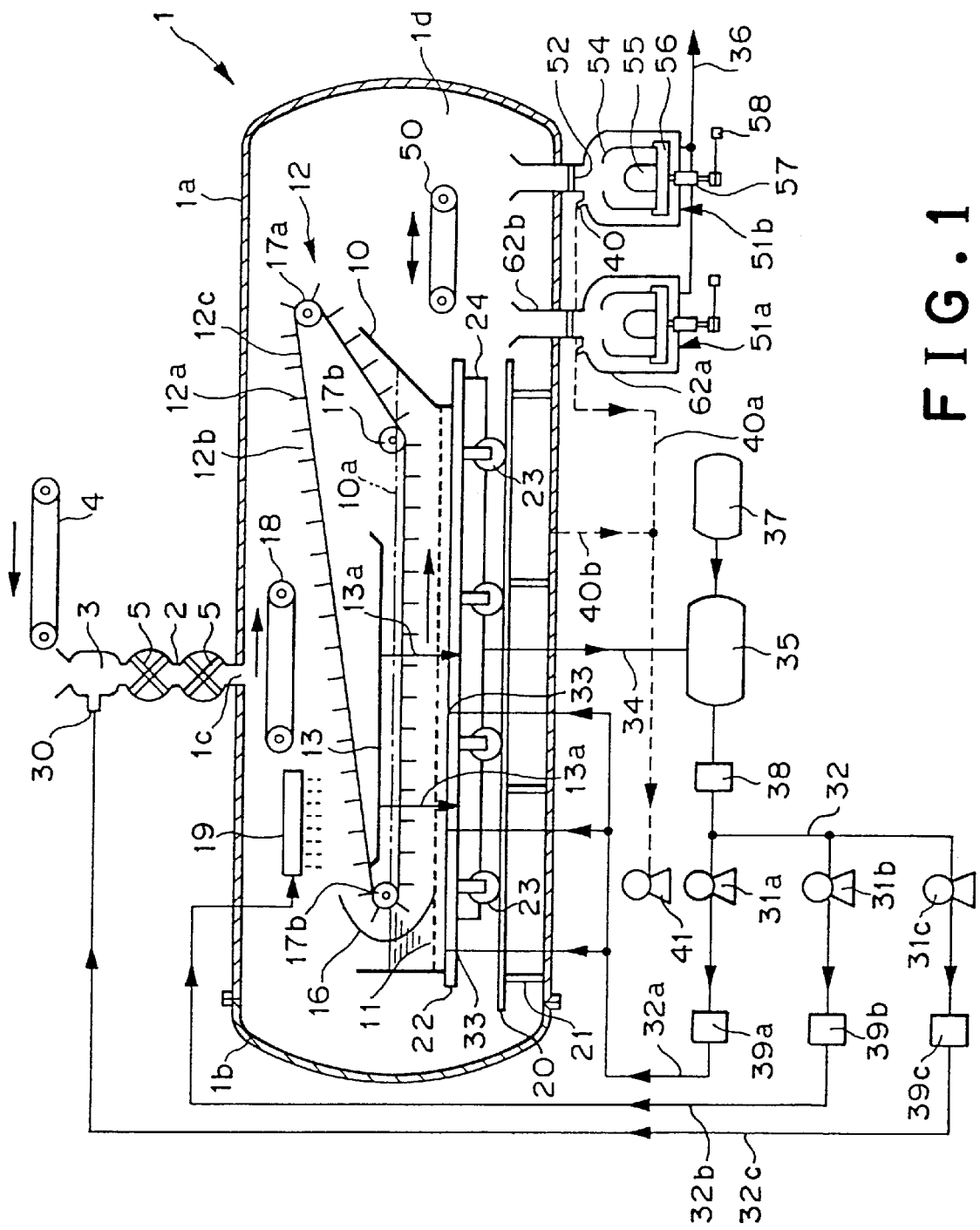
FIG. 1 is a schematic diagram showing an outline structure of one embodiment of a vacuum-heat processing apparatus of the present invention as applied to a dry food making equipment.

As shown in FIG. 1 representing the concept of the vacuum heating and drying apparatus of this embodiment and FIG. 2 representing the structure of its oil remover, the vacuum heating and drying apparatus of this embodiment performs a series of processes, which involves throwing a material to be processed to make dry food, together with cooking oil preheated to about 60° C., into a hopper 3 communicating with a vacuum container 1 evacuated to a predetermined vacuum pressure of, for example, 20 Torr; transferring them on a transport conveyor 12 installed in the vacuum container 1; showering cooking oil heated to a predetermined temperature, for example 60–100° C., (preferably 80° C. when the material is potato), over the material being carried by the transport conveyor 12 to perform preprocessing; feeding the material into a process tank 10 containing cooking oil heated to 70–130° C. (preferably 90° C. when the material is potato) to subject the material to a predetermined heating process; and then transporting the food product to an oil remover 51 where the food product is removed of oil soaked in the product and then dried, the oil remover 51 functioning as an oil removing means of the present invention evacuated to a pressure equal to or lower than that of the interior of the vacuum container 1.

The cylindrical vacuum container 1 has a cylindrical body 1a and an end plate 1b removably and hermetically joined to the body 1a. An introducing pipe 2 communicates perpendicularly to an inlet opening 1c formed at the upper end portion of the vacuum container 1 on the front side. While in this embodiment the introducing pipe 2 is connected perpendicular to the inlet opening 1c, it may be connected with inclination to the inlet opening 1c because the material passing through the introducing pipe 2 needs only to fall by gravity. The hopper 3 is connected to the inlet opening 1c of the vacuum container 1 via the introducing pipe 2.

A material supply conveyor 4 is intended to carry the material to the hopper 3, and the front end of the material supply conveyor 4 is positioned immediately above the hopper 3.

An oil supply port 30 for preheating formed at the side wall of the hopper 3 is connected with a preheating oil supply pump 31c through a preheating oil supply pipe 32c.

Two rotary valves 5 rotated by a drive source (not shown) at the same speed in the same direction are arranged in series as a sealing means of the present invention. Although this embodiment uses two rotary valves 5, only one may be provided. Alternatively, the sealing means may use two shutters that open or close the introducing pipe 2 alternately.

The material is carried in from the material supply conveyor 4 and the oil for preheating is supplied from the oil supply pipe 32c via the preheating oil supply port 30. In the hopper 3, the material is preheated by the preheating oil. The material and the oil together flow down through the hopper 3 by gravity toward the inlet opening 1c, guided by each blade of the two rotary valves 5 that rotate in the same direction, until they drop in the vacuum container 1 from the inlet opening 1c.

A vacuum chamber 1d formed in the vacuum container 1 is connected through an exhaust pipe 40b to a vacuum pump 41 and evacuated to a predetermined pressure, for example 20 Torr. A sufficient amount of oil is supplied into the hopper 3 at all times to allow the material to easily flow down through the introducing pipe 2 along with the oil into the vacuum chamber 1d of the vacuum container 1. The blades of the rotary valves 5 are in slidably contact with the inner wall of the valve body and there is the oil between the blades and the valve body, so that the vacuum container 1 is completely sealed from the external atmosphere. Installed in the vacuum container 1 is a processing oil tank 10 shaped like a boat opening at the top which has formed in its bottom wall a plurality of processing oil supply ports 33 that are connected to one processing oil supply pump 31a through processing oil supply pipes 32a. A processing oil, heated to a predetermined temperature, for example 90° C., higher than the above preheating temperature and a preprocessing temperature described above, is delivered by the processing oil supply pump 31a through the processing oil supply pipes 32a and the processing oil supply ports 33 into the processing oil tank 10.

In the processing oil tank 10 is laid a meshed dispersing plate 11 at some height from the bottom of the tank. Installed directly above the processing oil tank 10 is a transport conveyor 12 that carries the material dropped into the vacuum container 1 to the processing oil tank 10 and which extends longitudinally of the processing oil tank 10 (in the lateral direction in FIG. 1). The transport conveyor 12 has a drive roller 17a coupled to a driving source (not shown) fixedly secured to the outer wall of the vacuum container 1 with a known seal mechanism, a pair of auxiliary rollers 17b, and an endless transport belt 12c wound around these rollers 17a, 17b. The lower end portions of the auxiliary rollers 17b as well as a part of the endless transport belt 12c between these rollers 17b are positioned below a surface level 10a of the processing oil in the processing oil tank 10. In other words, they are submerged in the processing oil. The endless transport belt 12c is driven counterclockwise in FIG. 1 by the drive roller 17a.

The endless transport belt 12c of the transport conveyor 12 is provided with partition plates 12a at predetermined intervals that project outwardly from its surface to form basket-shaped material holding portions 12b between the adjacent partition plates 12a. The material dropped in from the inlet opening 1c is distributed among the basket-like material holding portions 12b in predetermined amounts and carried to the processing oil tank 10.

The endless transport belt 12c is made in the form of a mesh of a wire of, for example, SUS-304 to allow free passage of the processing oil therethrough. The material to be processed in the processing oil tank 10 floats in the upper layer of the processing oil by the specific gravity difference between the material and the processing oil and by its buoyancy. The material is subjected to a predetermined heating while being held in the material holding portions 12b by the partition plates 12a.

At one end of the transport conveyor 12 a semi-circular guide plate 16 is arranged to encompass one of the auxiliary rollers 17b, with only a small clearance between the guide plate 16 and the distal ends of the partition plates 12a. The lower part of the guide plate 16 is submerged in the processing oil in the processing oil tank 10.

As described above, the material is supplied onto the transport conveyor 12 at the other end above the surface level 10a of the processing oil in the processing oil tank 10 and transported along with the transport belt 12c toward the left in FIG. 1 while being held in the material holding portions 12b. When it reaches the left end of the transport conveyor 12 and is about to be thrown into the processing oil in the processing oil tank 10, the material is held in the material holding portions 12b by the guide plate 16 so that it will not scatter in the processing oil tank 10. As a result, the material in the basket-like material holding portions 12b of the transport conveyor 12 is carried in the processing oil tank 10, directly submerged in the processing oil in the processing oil tank 10.

In the vacuum chamber 1d immediately below the inlet opening 1c there is arranged an auxiliary conveyor 18 that receives on one end side the material falling from the inlet opening 1c and carries it to the other end side of the transport conveyor 12. If the material falls in a lump from the inlet opening 1c onto the auxiliary conveyor 18 at one end, the operation of the auxiliary conveyor 18 can scatter the lumped material and supply it dispersedly onto the transport conveyor 12. Hence, where there is no possibility of the material forming into a lump, this auxiliary conveyor 18 may not be provided.

Above the one end side of the transport conveyor 12 a shower nozzle 19 is arranged and directed downwardly to shower a processing liquid, heated to a predetermined temperature, for example 80° C., higher than the preheating temperature, over the material on the transport conveyor 12 for preprocessing. The shower nozzle 19 is connected to a preprocessing oil supply pump 31b through a preprocessing oil supply pipe 32b.

The material is preprocessed by showering it with the processing oil lower in temperature than the processing oil in the processing oil tank 10 prior to the processing in the processing oil tank 10 for the following reason. If these preheating and preprocessing are not performed in sequential steps, evaporation occurs only at the surface of the material failing to make the whole material ideally porous, resulting in the material breaking into fine pieces or its shape being deformed.

Hence, by performing the preprocessing and preheating on a step-by-step basis the entire material can be made to have an ideal porous state, offering dry food of good quality.

Arranged below the auxiliary conveyor 18 and the shower nozzle 19 on the inner side of the endless transport belt 12c of the transport conveyor 12 at a position higher than the surface level 10a of the processing oil in the processing oil tank 10 is an oil receiving pan 13 which communicates with waste oil troughs 24 via a plurality of used oil pipes 13a communicating with the side walls of the pan.

Thus, the processing oil dropped into the vacuum container 1 together with the material from the introducing pipe 2 and the processing oil showered from the shower nozzle 19 pass through the upper part of the transport belt 12c and are collected onto the oil receiving pan 13 thereafter being discharged into the waste oil troughs 24. This prevents the low-temperature processing oil dropped into the vacuum container 1 together with the material from the introducing pipe 2 and the low-temperature processing oil showered from the shower nozzle 19 from getting mixed with the high-temperature processing oil in the processing oil tank 10, thus facilitating the temperature control of the processing oil in the processing oil tank 10. Excess processing oil supplied from the processing oil supply ports 33 that flows out of the processing oil tank 10 through overflow ports (not shown) in the side walls of the processing oil tank 10 are received in the waste oil troughs 24 provided on each side of the processing oil tank 10 and then recovered to an oil tank 35 via an oil recovery pipe 34 communicating with the waste oil troughs 24.

This oil tank 35 is connected through a filter 38 to an oil circulation pipe 32 which in turn is connected with the processing oil supply pump 31a and the oil supply pumps 31b, 31c. That is, these pumps 31a, 31b, 31c circulate oil from the oil tank 35 to the hopper 3, the shower nozzle 19 and the processing oil tank 10.

The oil tank 35 is connected with a makeup virgin oil tank 37 to supplement the oil tank 35 as required. The each processing oil supply pipes 32a, 32b and the oil supply pipe 32c are provided with heaters 39a, 39b, 39c to heat the oil to predetermined temperatures and also with a flow meter, a thermometer and an automatic valve (none of these are shown). Predetermined flows of oil set at predetermined temperatures are supplied to the hopper 3, the shower nozzle 19 and the processing oil tank 10, respectively, thus optimumly setting the processing temperatures of the material in these areas.

On the floor of the vacuum container 1 is laid rails 20 having legs 21. A platform car 22 having a plurality of wheels 23 rolling on the rails 20 mounts the processing oil tank 10, the transport conveyor 12, the auxiliary conveyor 18 and the shower nozzle 19 so that they can move along the rails 20.

With the processing oil tank 10 and other associated devices mounted on the platform car 22 so that they can be moved on the rails 20, the regular maintenance, including cleaning and repair, of these devices can be performed easily by returning the pressure inside the vacuum chamber 1d to the atmosphere, removing the end plate 1b from the body 1a, disconnecting the pipes and drive mechanisms for the processing oil tank 10, transport conveyor 12, auxiliary conveyor 18 and shower nozzle 19, and then drawing the platform car 22 out of the body 1a.

Figure 3:
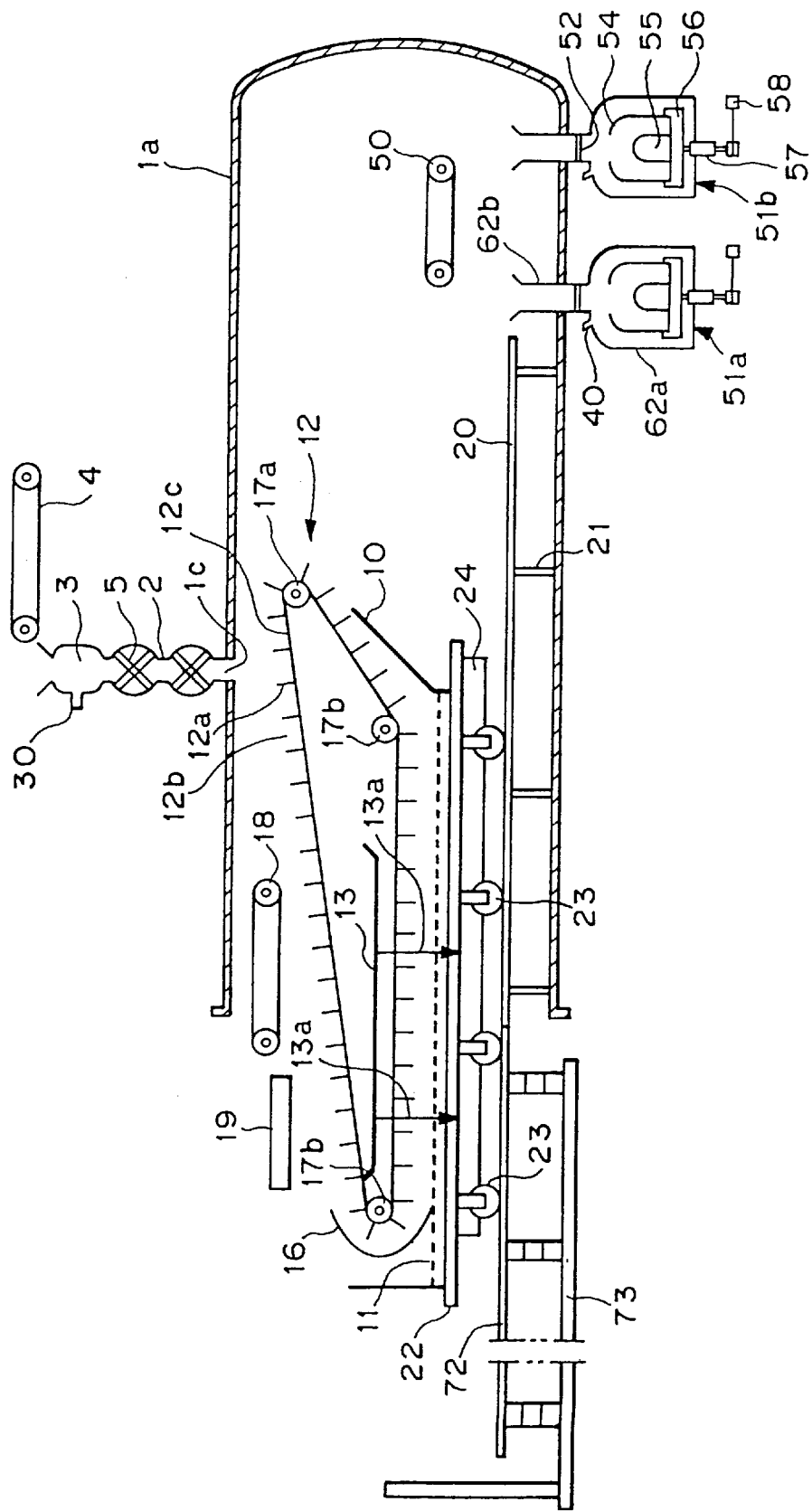
FIG. 3 is a conceptual diagram showing how the embodiment of FIG. 1 is maintained.

In this case, as shown in FIG. 3 representing the state of the apparatus during maintenance, the maintenance can further be facilitated by withdrawing the platform car 22 onto a substage 73 that has auxiliary rails 72 connectable to the rails 20.

At the end portion of the vacuum container 1 opposite the end plate 1b there is installed a material takeup conveyor 50 that receives the heated material that was scooped up from the other end of the processing oil tank 10 by the partition plates 12a. The material takeup conveyor 50 rotates forward and backward intermittently to discharge the material downward from its both ends.

A pair of oil removing devices 51a, 51b (these two may be referred to generally as an oil remover 51 hereinafter) with their upper ends open immediately below the ends of the material takeup conveyor 50 are of a centrifugal type in this embodiment as shown in FIG. 2. That is, the oil remover 51 has a construction in which its body 62a is arranged outside the vacuum container 1 and the upper part of its throat portion 62b with a funnel-like open top is positioned inside the vacuum container 1. In the throat portion 62b, a shutter 52 that is driven by an air cylinder 53 to open and close the throat portion 62b is provided. At the upper end of the body 62a an exhaust port 40 is formed which is connected to a vacuum pump 41 via an exhaust pipe 40a to keep the interior of the oil remover 51 at a vacuum pressure equal to or lower than that of the vacuum chamber 1d.

The vacuum pump 41 also communicates with the vacuum container 1 via the exhaust pipe 40b to maintain the vacuum chamber id at a predetermined vacuum level.

A rotary table 56 is rotatably installed with a bearing 57 in the lower end portion of the body 62a of the oil remover 51. An endless belt 56b driven by an oil removing motor 58 is wound around a pulley 56a provided at the lower end of the rotary table 56. The rotary table 56 is rotated at a predetermined speed.

Removably mounted on the rotary table 56 is a cage body 54 that has its top portion open and its circumferential wall formed of a mesh. The cage body 54 has a core 55 secured immediately below the open portion of the cage body 54.

The side wall of the body 62a is formed with an opening 61 through which the cage body 54 is taken in or out. The opening 61 is hermetically closed by a shutter 60 pressed against the opening 61. The shutter 60 is driven by an air cylinder 59 to open and close the opening 61. An open-close means according to the present invention comprises the shutter 60 and the air cylinder 59.

At the side of the opening 61 there is provided a known transfer machine 70, which has a grip handle 71 activated by a driving source (not shown) to hold and move the cage body 54 mounted on the rotary table 56 out of the oil remover 51.

The oil remover 51 with its construction described above performs the following sequence of operations: closing the throat portion 62b by the shutter 52, evacuating the interior of the body 62a via the exhaust port 40 by the vacuum pump 41 to the same vacuum pressure as the vacuum chamber 1d of the vacuum container 1, and then opening the shutter 52 to allow the processed material to be loaded from the material takeup conveyor 50 into the oil remover 51.

At this time, the material dropped in from the throat portion 62b is evenly dispersed in the cage body 54 by the core 55 and, as the cage body 54 is rotated by operating the oil removing motor 58, the centrifugal force causes the oil soaked in the material to be removed and pass through the side wall of the cage body 54. The oil thus removed is discharged outside through a discharged oil pipe 36 communicating with the bottom of the body 62a.

When a predetermined time period of the oil removing process is finished, the reduced pressure state in the oil remover 51 is canceled, followed by the stopping of the oil removing motor 58, the activation of the air cylinder 59 to retract the shutter 60 from the opening 61, and the transfer of the cage body 54 out of the oil remover 51 by the transfer machine 70.

In this embodiment, two oil removers 51 may be used whereby while one of the oil removers is operated to remove oil the other is evacuated to the same negative pressure as the vacuum container 1 to permit continuous processing. That is, the material vacuum-heated in the processing oil tank 10 falls from the transport conveyor 12 onto the material takeup conveyor 50 located below the rear end side of the transport conveyor 12. The material takeup conveyor 50 is operated in the forward direction to drop the material into one oil remover 51a for oil removing processing. This is followed by the operation of the material takeup conveyor 50 in the reverse direction to subsequently throw the material that has undergone the vacuum heating process into the other oil remover 51b to perform the oil removing process on the material. It is of course possible to provide only one oil remover 51.

Because to obtain the material in a good dry state requires extracting the oil soaked in the heated material as early as possible under the same negative pressure as the vacuum container without returning the negative pressure to normal, it is preferable to install two or more oil removers 51.

As explained above, because the top portion of the oil remover 51 is positioned inside the vacuum container 1 whose inner pressure is reduced to a predetermined negative pressure and because the interior of the oil remover 51 is also evacuated to the same negative pressure, excess oil soaked in the material that has undergone the vacuum-heating process in the processing oil tank 10 can be efficiently removed in the oil remover 51 whose inner pressure is set to the same negative pressure as the vacuum chamber 1d, thus producing a good quality processed material with minimum oil remaining therein.

Next, the overall operation of this embodiment will be explained.

The material packed in a corrugated cardboard box is unpacked and then carried by the material supply conveyor 4 thereafter being dropped into the hopper 3.

Since the hopper 3 is supplied with oil preheated to less than 60° C. from the oil supply port 30, the material dropped in mixes with the oil and falls down through the introducing pipe 2 by gravity. The clearance between the distal end of the each blade of the rotary valve 5 provided in the introducing pipe 2 and the inner wall of the valve casing is very small and the oil is sticking to the clearance, respectively. Thus, as the blades of the each rotary valves 5 rotate, the material and the oil are fed to the vacuum container 1 located below which is kept at a reduced pressure, for example, 20 Torr. At the same time, the vacuum chamber 1d of the vacuum container 1 is kept isolated from the atmosphere at all times.

The dispersing conveyor 18 is provided immediately below the inlet opening 1c. Furthermore, the transport conveyor 12 is positioned below the dispersing conveyor 18. Hence, the material supplied together with the preheating oil is dispersed on the dispersing conveyor 18 and then dropped in a predetermined amount at a time onto the transport conveyor 12. The material on the transport conveyor 12 is showered with processing oil, heated to 60–100° C., from the shower nozzle 19.

If, under the reduced pressure, the material is brought into contact with the high-temperature processing oil at once, the material will normally be heated rapidly, evaporating water from its surface quickly, failing to maintain the ideal porous state, which in turn deforms the shape of the material or breaks it into small pieces. With this invention, however, the preheating and the preprocessing are performed in sequential steps so that the material as a whole can be processed into an ideal porous state.

The processing oil flowing down from the introducing pipe 2 and the processing oil showered from the shower nozzle 19 are received by the oil receiving pan 13 and then collected, along with the processing oil overflowing from the processing oil tank 10, to the waste oil troughs 24, from which the oil is recovered via the oil recovery pipe 34 to the oil tank 35 and then recirculated.

The material, which was preprocessed by the processing oil showered from the shower nozzle 19 while being carried on the transport conveyor 12, is submerged in the processing oil in the tank 10 at 90–130° C. for a predetermined period of time thus undergoing a predetermined heating process. In this embodiment, a predetermined flow of processing oil heated to a predetermined temperature is supplied from a plurality of processing oil supply pipes 32a to the processing oil tank 10 through the processing oil supply ports 33. It is also possible to regulate the temperature and flow of the processing oil, as required, to set zones in the processing oil tank 10 with different vacuum heating conditions in which to process the material. Hence, the processing oil in the processing oil tank 10 can be given a temperature gradient such that the temperature of oil decreases toward one end of the processing oil tank 10 (for example, right side in FIG. 1).

The material that was heated for a predetermined time by the processing oil in the tank 10 heated to a predetermined temperature is carried onto the material takeup conveyor 50, from which it is dropped into the throat portion 62b of the oil remover 51 whose top portion is wide open and located inside the vacuum container 1. The interior of the oil remover 51 is set to the same negative pressure as the vacuum container 1 so that the oil soaked in the material dropped into the cage body 54 can be efficiently removed by the centrifugal action produced by rotating the cage body 54. After the oil removing operation has been performed for a predetermined period, the shutter 52 is operated to close the throat portion 62b, the interior of the oil remover 51 is returned to the normal pressure, and the cage body 54 unlocked from the rotary table 56 is then transferred by the transfer machine 70 out of the oil remover 51 through the opening 61 of the oil remover 51, which was opened by the retracted shutter 60.

While this embodiment sets the interior of the oil remover 51 at the same negative pressure as the interior of the vacuum container 1, it is possible to further reduce the inner pressure of the oil remover 51 below the negative pressure of the vacuum container 1 to utilize the pressure difference to increase the oil removing effect.

The present invention has been described in detail with respect to a preferred embodiment, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A vacuum-heat processing method comprising the steps of:

performing a first processing for an object to be processed by immersing the object in a processing liquid adjusted to a first temperature;

dropping the object subjected to said first processing onto a transport conveyor in a vacuum chamber;

performing a second processing for the object on said transport conveyor by showering the object with a processing liquid adjusted to a second temperature; and performing a third processing for the object subjected to said second processing by dropping the object from said transport conveyor into a processing liquid adjusted to a third temperature, said processing liquid being contained in a processing liquid tank installed in said vacuum chamber.

2. The vacuum-heat processing method as claimed in claim 1, wherein said processing liquid used in said first processing is dropped onto said transport conveyor in said vacuum chamber together with the object subjected to said first processing.

3. The vacuum-heat processing method as claimed in claim 1, further comprising a step of transferring the object subjected to said third processing from said processing liquid tank to a second vacuum chamber provided below and communicating with said vacuum chamber and then removing said processing liquid from the object.

4. The vacuum-heat processing method as claimed in claim 3, wherein a vacuum level in said second vacuum chamber is set equal to or higher than that of said vacuum chamber.

5. A method of manufacturing a dry food comprising the steps of:

performing a first processing for a material to be made a dry food by immersing the material in a processing oil adjusted to a first temperature;

dropping the material subjected to said first processing onto a transport conveyor in a vacuum chamber;

performing a second processing for the material on said transport conveyor by showering the material with a processing oil adjusted to a second temperature;

performing a third processing for the material subjected to said second processing by dropping the material from said transport conveyor into a processing oil adjusted to a third temperature, said processing oil being contained in a processing oil tank installed in said vacuum chamber; and transferring the material subjected to said third processing from said processing oil tank to an oil removing means provided below and communicating with said vacuum chamber and then removing said processing oil from the material to produce a dry food.

6. The method of manufacturing a dry food as claimed in claim 5, wherein said processing oil used in said first processing is dropped onto said transport conveyor in said vacuum chamber together with the material subjected to said first processing.

7. The method of manufacturing a dry food as claimed in claim 5, wherein said second temperature is higher than said first temperature and said third temperature is higher than said second temperature.

* * * * *